US010875242B2

(12) United States Patent
Saito et al.

(10) Patent No.: US 10,875,242 B2
(45) Date of Patent: Dec. 29, 2020

(54) THREE-DIMENSIONAL MODELING APPARATUSES AND METHODS FOR FABRICATING THREE-DIMENSIONAL OBJECTS

(71) Applicant: Seiko Epson Corporation, Tokyo (JP)

(72) Inventors: Koichi Saito, Matsumoto (JP); Shunsuke Mizukami, Fujimi (JP); Kazuhide Nakamura, Asahi (JP)

(73) Assignee: Seiko Epson Corporation (JP)

( * ) Notice: Subject to any disclaimer, the term of this patent is extended or adjusted under 35 U.S.C. 154(b) by 350 days.

(21) Appl. No.: 15/977,256

(22) Filed: May 11, 2018

(65) Prior Publication Data
US 2018/0326658 A1    Nov. 15, 2018

(30) Foreign Application Priority Data
May 12, 2017   (JP) .................................. 2017-095394

(51) Int. Cl.
*B29C 35/16* (2006.01)
*B29C 64/20* (2017.01)
(Continued)

(52) U.S. Cl.
CPC ............. *B29C 64/20* (2017.08); *B29C 35/16* (2013.01); *B29C 64/106* (2017.08); *B29C 64/118* (2017.08); *B29C 64/194* (2017.08); *B29C 64/209* (2017.08); *B29C 64/245* (2017.08); *B29C 64/393* (2017.08); *B33Y 10/00* (2014.12);
(Continued)

(58) Field of Classification Search
CPC ............ B33Y 30/00; B29C 2035/1658; B29C 2035/1666; B29C 2035/1683; B29C 64/106; B29C 64/118; B29C 64/188; B29C 64/194; B29C 64/20; B29C 64/209
See application file for complete search history.

(56) References Cited

U.S. PATENT DOCUMENTS 7,261,541 B2 *   8/2007   Fong .................... B29C 41/46
                                                      425/174
7,700,016 B2 *   4/2010   Wigand ................ B33Y 10/00
                                                      264/49
(Continued)

FOREIGN PATENT DOCUMENTS

CN        104069960 A       10/2014
CN        105773979 A *      7/2016
(Continued)

OTHER PUBLICATIONS

Extended European Search Report for Application No. EP 18 16 9410 dated Oct. 11, 2018 (6 pages).

*Primary Examiner* — Atul P. Khare
(74) *Attorney, Agent, or Firm* — Harness, Dickey & Pierce, P.L.C.

(57) ABSTRACT

A three-dimensional modeling apparatus for fabricating a three-dimensional object includes a plasticizing section that plasticizes a thermoplastic material to transform into a molten material; an ejection section for ejecting the molten material; a first air blowing section that blows air from a circumference of the nozzle toward the molten material ejected from the nozzle; a platform on which the molten material ejected from the nozzle is deposited; and a control unit that changes a relative positional relationship between the ejection section and the platform.

8 Claims, 8 Drawing Sheets

(51) Int. Cl.
*B29C 64/118* (2017.01)
*B33Y 30/00* (2015.01)
*B29C 64/106* (2017.01)
*B29C 64/209* (2017.01)
*B29C 64/194* (2017.01)
*B33Y 10/00* (2015.01)
*B33Y 50/02* (2015.01)
*B29C 64/245* (2017.01)
*B29C 64/393* (2017.01)
*B33Y 70/00* (2020.01)
*B29K 101/12* (2006.01)

(52) U.S. Cl.
CPC ............... *B33Y 30/00* (2014.12); *B33Y 50/02* (2014.12); *B29C 2035/1658* (2013.01); *B29C 2035/1666* (2013.01); *B29K 2101/12* (2013.01); *B33Y 70/00* (2014.12)

(56) References Cited

U.S. PATENT DOCUMENTS

| | | | |
|---|---|---|---|
| 8,936,742 B2 * | 1/2015 | Sun | B29C 48/911 264/211.14 |
| 10,173,409 B2 * | 1/2019 | Roviaro | B33Y 50/02 |
| 10,328,492 B2 * | 6/2019 | Kaneta | B22F 5/12 |
| 2002/0129485 A1 * | 9/2002 | Mok | G05B 19/4099 29/527.2 |
| 2012/0193335 A1 | 8/2012 | Guldberg | |
| 2015/0314528 A1 | 11/2015 | Gordon | |
| 2017/0066194 A1 * | 3/2017 | Bromer | B33Y 30/00 |
| 2017/0120517 A1 | 5/2017 | Shimoyama | |
| 2017/0210069 A1 | 7/2017 | Stubenruss | |
| 2018/0043612 A1 * | 2/2018 | Gray | B29C 64/209 |

FOREIGN PATENT DOCUMENTS

| | | | | |
|---|---|---|---|---|
| CN | 103 552 240 B | | 11/2016 | |
| CN | 106573405 A | | 4/2017 | |
| CN | 106671409 A | * | 5/2017 | |
| EP | 0 967 067 A1 | | 12/1999 | |
| EP | 3106290 A1 | * | 12/2016 | ........... B29C 64/118 |
| JP | 2006-192710 A | | 7/2006 | |
| JP | 2013-501627 A | | 1/2013 | |
| JP | 2015-178191 A | | 10/2015 | |
| JP | 2017-052129 A | | 3/2017 | |
| WO | WO-97-024217 A1 | | 7/1997 | |
| WO | WO-2015-137930 A1 | | 9/2015 | |
| WO | WO-2016-020150 A1 | | 2/2016 | |

* cited by examiner

FIG. 11

| AIR OUTLET PATTERN | | | | | |
|---|---|---|---|---|---|
| HIGH FLOW RATE | 77:c,d,e,f,g<br>87:C,D,E,F,G | 77:a,e,f,g,h<br>87:A,E,F,G,H | 77:a,b,g,h<br>87:A,B,G,H | 77:a,b,c,d,e<br>87:A,B,C,D,E | 77:b,c,d,e,f<br>87:B,C,D,E,F |
| MEDIUM FLOW RATE | 77:b,h<br>87:B,H | 77:b,d<br>87:B,D | 77:d,f<br>87:D,F | 77:f,h<br>87:F,H | 77:a,g<br>87:A,G |
| LOW FLOW RATE | 77:a<br>87:A | 77:c<br>87:C | 77:e<br>87:E | 77:g<br>87:G | 77:h<br>87:H |
| CROSS-SECTIONAL VIEW OF FLOW DIRECTION | | | | | |

THREE-DIMENSIONAL MODELING APPARATUSES AND METHODS FOR FABRICATING THREE-DIMENSIONAL OBJECTS

This application claims priority under 35 U.S.C. § 119 to Japanese Patent Application No. 2017-095394 filed on May 12, 2017, the entire disclosure of which is expressly incorporated by reference herein.

BACKGROUND

1. Technical Field

The present invention relates to three-dimensional modeling apparatuses and methods for fabricating three-dimensional objects.

2. Related Art

Regarding three-dimensional modeling apparatuses, JP-A-2006-192710 describes a technique of improving the modeling precision for three-dimensional objects when a plasticized material which quickly solidifies is used. According to the technique, a solvent is supplied on the top of a solidified material to melt the solidified material, and then a molten material is further deposited onto the material.

However, depending on the temperature of the plasticized material, the material may not quickly solidify, and the deposition may be performed while the material is melted. As a consequence, the deposited material may be deformed due to its weight, leading to a low modeling precision.

SUMMARY

The present invention can be implemented as the following aspects.

(1) According to an aspect of the present invention, a three-dimensional modeling apparatus for fabricating a three-dimensional object is provided. The three-dimensional modeling apparatus includes a plasticizing section that plasticizes a thermoplastic material to transform into a molten material; an ejection section for ejecting the molten material; a first air blowing section that blows air from a circumference of the nozzle toward the molten material ejected from the nozzle; a platform on which the molten material ejected from the nozzle is deposited; and a control unit that changes a relative positional relationship between the ejection section and the platform. According to the three-dimensional modeling apparatus of this aspect, deposition can be performed after the temperature of the molten material ejected from the nozzle is decreased. Accordingly, deformation of the three-dimensional object due to its weight after deposition can be prevented. As a result, the modeling precision of the three-dimensional object can be improved.

(2) In the three-dimensional modeling apparatus of the above aspect, the first air blowing section may include a plurality of first air outlets disposed around the nozzle to perform blowing of air toward the molten material ejected from the nozzle, a flow rate of the first air outlets can be each adjusted, and the control unit may control the flow rate of each of the first air outlets depending on a movement direction of the ejection section relative to the platform. With this configuration, the modeling precision of the three-dimensional object can be further improved.

(3) The three-dimensional modeling apparatus of the above aspect may further include a second air blowing section that blows air from a circumference of the first air blowing section in a direction toward the platform. With this configuration, air blown from the second air blowing section toward the platform can block a change in the air flow around the ejection section. Accordingly, fluctuation in the ejection direction of the material ejected from the nozzle due to disturbance factors can be prevented. Accordingly, the modeling precision of the three-dimensional object can be further improved.

(4) In the three-dimensional modeling apparatus of the above aspect, the second air blowing section may include a plurality of second air outlets disposed around the first air blowing section to perform blowing of air toward the platform, a flow rate of the second air outlets can be each adjusted, and the control unit may control the flow rate of each of the second air outlets depending on a movement direction of the ejection section relative to the platform. Accordingly, the modeling precision of the three-dimensional object can be further improved.

(5) In the three-dimensional modeling apparatus of the above aspect, the plasticizing section may include a flat screw and a heating unit. According to this three-dimensional modeling apparatus, the entire apparatus can be downsized.

The present invention can be implemented in various forms besides the three-dimensional modeling apparatus described above. For example, the present invention can be implemented as a method for fabricating a three-dimensional object, a computer program for fabricating a three-dimensional object, a non-transitory tangible storage medium that stores the computer program, or the like.

BRIEF DESCRIPTION OF THE DRAWINGS

The invention will be described with reference to the accompanying drawings, wherein like numbers reference like elements.

FIG. 11 is an explanatory view which illustrates a concept of flow rate control by the control unit.

DESCRIPTION OF EXEMPLARY EMBODIMENTS

A. First Embodiment

Figure 1:
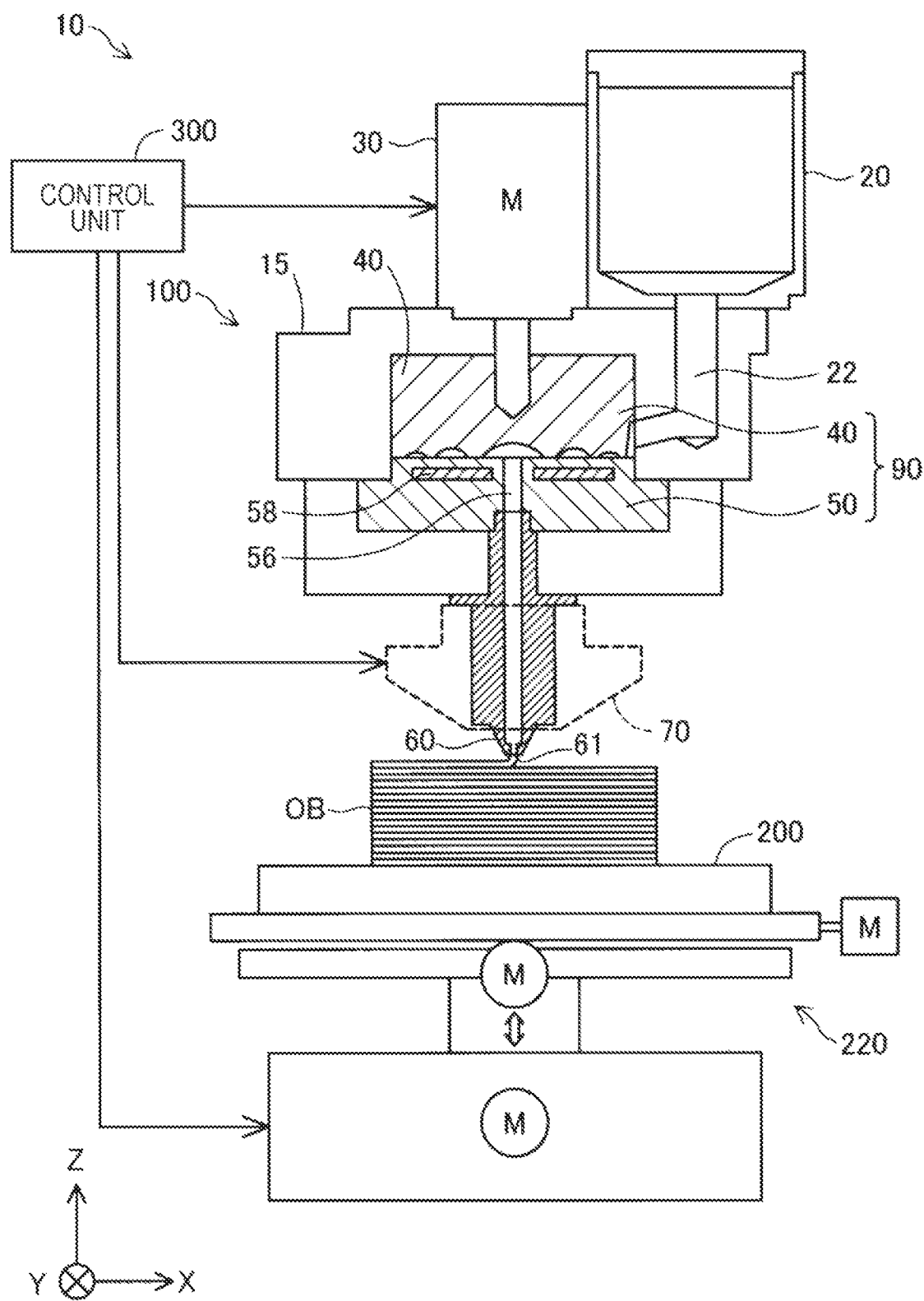
FIG. 1 is an explanatory view of a schematic configuration of a three-dimensional modeling apparatus of a first embodiment.

FIG. 1 is an explanatory view of a schematic configuration of a three-dimensional modeling apparatus 10 of a first embodiment of the present invention. The three-dimensional modeling apparatus 10 includes an ejection unit 100, a platform 200, and a control unit 300. FIG. 1 indicates three directions X, Y, and Z perpendicular to each other. The X direction and the Y direction are horizontal directions, and + the Z direction is a vertically upward direction. These directions are indicated as necessary in other drawings as well. Hereinafter, +Z direction is also referred to as an "upper side," and −Z direction is also referred to as a "lower side."

The ejection unit 100 includes a screw case 15, a hopper 20 that accommodates a material, a drive motor 30, a flat screw 40, a heating unit 50, an ejection section 60 having a nozzle 61 for ejecting a molten material, and an air blowing unit 70. The flat screw 40 and the heating unit 50 constitute a plasticizing section 90 that plasticizes a thermoplastic material to transform into a molten material. The term "plasticize" as used herein refers to application of heat to melt a material.

A thermoplastic material is inputted into the hopper 20. Examples of a material that can be used include polypropylene resin (PP), polyethylene resin (PE), polyacetal resin (POM), polyvinyl chloride resin (PVC), polyamide resin (PA), acrylonitrile butadiene styrene resin (ABS), polylactic acid resin (PLA), polyphenylene sulfide resin (PPS), poly ether ketone (PEEK), and polycarbonate (PC). Further, materials in the form of solids such as pellet and powder can be used. Further, thermoplastic materials may be composites containing a thermoplastic material and other components.

The flat screw 40 of the plasticizing section 90 is housed in the screw case 15 and is rotated by the drive motor 30. A material is supplied onto the side surface of the flat screw 40 from the hopper 20 via a communication path 22. A material is plasticized into a molten material in a space between the undersurface of the flat screw 40 and the upper surface of the heating unit 50 by rotation of the flat screw 40 and heat from the heating unit 50. The heating unit 50 has a heater 58 embedded therein for heating a material. The molten material is supplied to the ejection section 60 via a communication hole 56 disposed at the center of the heating unit 50, and ejected through the nozzle 61. The diameter of the nozzle 61 is, for example, in the range of 0.07 to 2.0 mm, and the line diameter of the molten material ejected from the nozzle 61 is also in the range of 0.07 to 2.0 mm.

The platform 200 is a table on which the molten material ejected from the nozzle 61 is deposited. In the present embodiment, the platform 200 has a plate shape. The platform 200 can be moved in three axis directions, that is, X, Y, and Z directions, by the transport mechanism 220. The transport mechanism 220 has a function of changing the relative positional relationship between the ejection section 60 and the platform 200. The transport mechanism 220 can be used to change the relative positional relationship between the ejection section 60 and the platform 200 to thereby produce a three-dimensional object OB having a desired shape. In the present embodiment, the transport mechanism 220 transports the platform 200 in a three-dimensional manner. However, the transport mechanism 220 may have a mechanism that moves the ejection section 60 (that is, the ejection unit 100) in a three-dimensional manner. Alternatively, another transport mechanism can be used in which one of the ejection section 60 (that is, the ejection unit 100) and the platform 200 is moved in the first or second axial direction, while the other may be moved in the other axial direction.

The control unit 300 controls the drive motor 30 of the ejection unit 100 and the transport mechanism 220 to thereby control the position of the ejection section 60 relative to the platform 200, and thus the position at which the molten material is deposited on the platform 200. Further, the control unit 300 controls blowing of air from the air blowing unit 70. In the present embodiment, the control unit 300 performs blowing of air from the air blowing unit 70 when the ejection section 60 ejects the molten material, and stops blowing of air from the air blowing unit 70 when the ejection section 60 does not eject the molten material. The control unit 300 can be implemented, for example, by a processor such as a CPU, and a computer including a memory. The memory stores a computer program for controlling the three-dimensional modeling apparatus 10. The computer program may be stored in a computer-readable non-transitory tangible recording medium.

Figure 2:
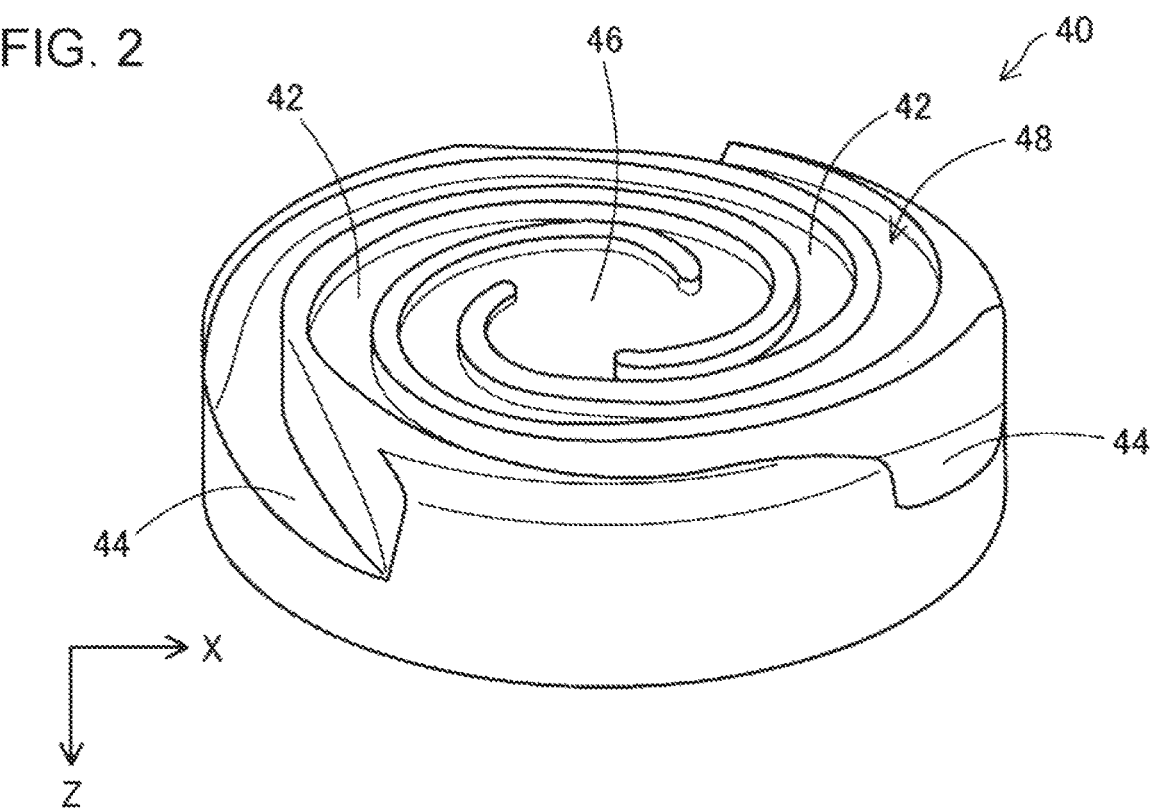
FIG. 2 is a perspective view of a flat screw.

FIG. 2 is a perspective view which illustrates the undersurface of the flat screw 40. The flat screw 40 is a screw having a substantially columnar shape with the height in the axial direction smaller than the diameter. The flat screw 40 has a plurality of scroll grooves 42 on the surface facing the heating unit 50 (FIG. 1). The surface on which the scroll grooves 42 are formed is referred to as a "scroll groove forming surface 48." The scroll grooves 42 are formed in a volute or spiral shape extending from the outer periphery of the flat screw 40 toward the center part 46 of the scroll groove forming surface 48. The scroll groove 42 is continuous with a material inlet 44 formed on the side surface of the flat screw 40. The material inlet 44 is a portion that receives a material supplied from the hopper 20 via the communication path 22. As the flat screw 40 rotates, the material is plasticized while being heated.

Figure 3:
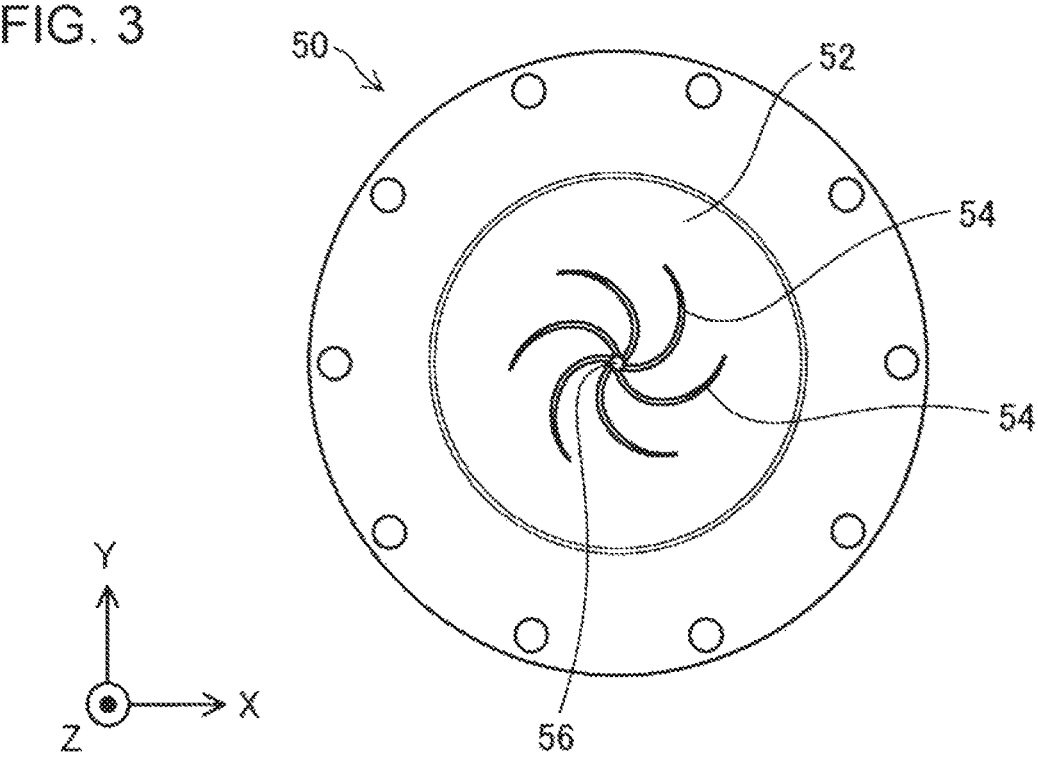
FIG. 3 is a plan view of a heating unit.

FIG. 3 is a plan view of the heating unit 50. The heating unit 50 has a screw facing surface 52 that faces the scroll groove forming surface 48 of the flat screw 40. The screw facing surface 52 has a plurality of guide grooves 54 formed in a volute or spiral shape. The communication hole 56 is formed at the center of the screw facing surface 52 so as to supply a molten material therethrough to the ejection section 60. The plurality of guide grooves 54 has a function of guiding a molten material to the communication hole 56. As shown in FIG. 1, the heating unit 50 has a heater 58 embedded therein for heating a material. The material is plasticized by heating of the heater 58 and rotation of the flat screw 40. The plasticized molten material is heated to a glass transition temperature or higher to be completely melted, and ejected from the ejection section 60 through the communication hole 56.

Figure 4:
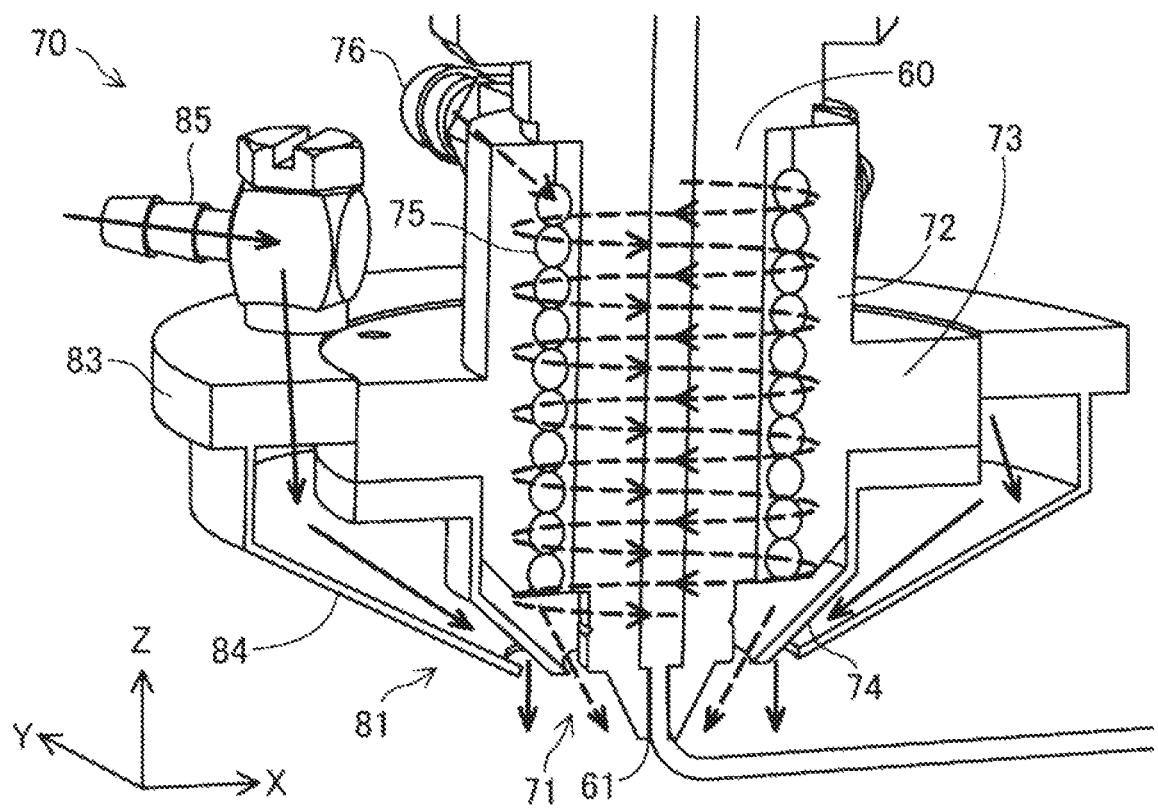
FIG. 4 is a cross-sectional perspective view of a schematic structure of an air blowing unit.
Figure 5:
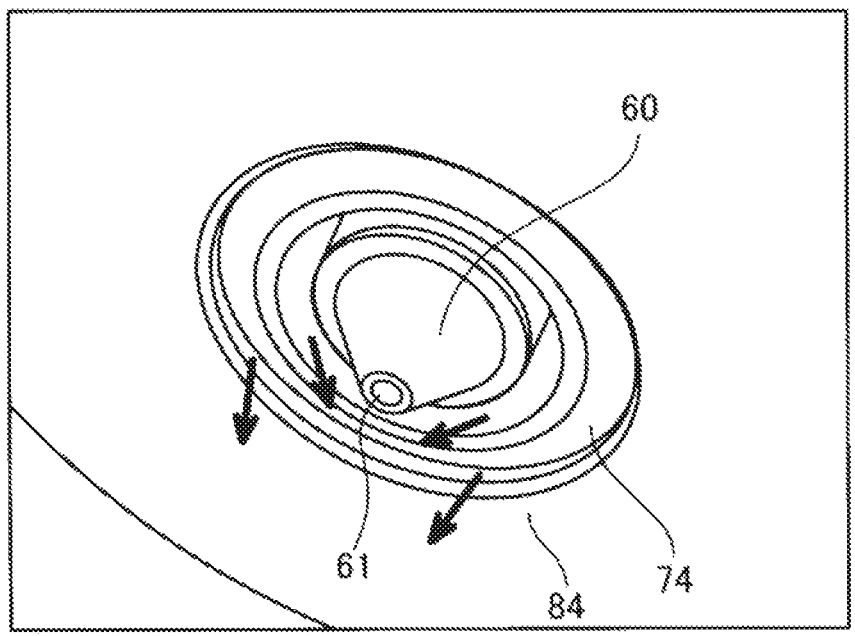
FIG. 5 is a perspective view of an undersurface of the air blowing unit.

FIG. 4 is a cross-sectional perspective view of a schematic structure of the air blowing unit 70. FIG. 5 is a perspective view of an undersurface of the air blowing unit 70. The air blowing unit 70 includes a first air blowing section 71 and a second air blowing section 81. In the present embodiment, the temperature of air blown from the first air blowing section 71 and the second air blowing section 81 is room temperature (20° C.).

The first air blowing section 71 blows air from the circumference of the nozzle 61 toward the molten material ejected from the nozzle 61. The first air blowing section 71 of the present embodiment blows air from a position above the tip of the nozzle 61 toward the molten material. In the present embodiment, the first air blowing section 71 includes a first member 72 having a substantially tubular shape which is fixed to the circumference of the ejection section 60 of a columnar shape. A protrusion 73 of a flange shape is provided on the outer periphery of the first member 72. A first air guide member 74 is provided on the distal side relative to the protrusion 73 (on the −Z direction-side). The first air guide member 74 formed in a substantially conical shape and has an opening at the center of the tip. From the opening of the first air guide member 74, the conical tip of the ejection section 60 protrudes in the −Z direction.

Inside the first member 72, a spiral flow path 75 is formed to extend along the outer periphery of the ejection section 60. A first introduction port 76 is provided at the upper end of the flow path 75 so that compressed air is introduced therethrough. The air which has flowed through the flow path 75 is blown out along the first air guide member 74 which is provided on the circumference of the nozzle 61 toward the molten material ejected from the nozzle 61. Since the compressed air flows through the spiral flow path 75, the air blown out from the first air blowing section 71 may become a turbulence. Accordingly, the temperature of the molten material can be efficiently decreased. The amount of air flow (flow rate) from the first air blowing section 71 is, for example, in the range of 3 to 50 L/min. This flow rate is set so that the temperature (for example, 200° C.) of the molten material ejected from the nozzle 61 is decreased to a temperature of to 30° C. higher than the glass transition temperature of the material, and more preferably a temperature of 10 to 20° C. higher than the glass transition temperature of the material. Moreover, the flow path 75 may have a double spiral structure. Alternatively, the flow path 75 is not limited to a spiral shape, and may be a tubular flow path, for example.

The first air blowing section 71 of the present embodiment configured as above performs blowing of air from the entire circumference of the nozzle 61. Alternatively, the first air blowing section 71 may be configured to blow air toward the molten material from air flow ports disposed at three or more, preferably four or more positions on the circumference of the nozzle 61 at a constant angular interval. With this configuration as well, air can be blown from the circumference of the nozzle 61.

The second air blowing section 81 blows air from the circumference of the first air blowing section 71 in a direction toward the platform 200. The direction toward the platform 200 refers to a direction having a component of a direction toward the platform 200, and is preferably a direction perpendicular to the upper surface of the platform 200. In the present embodiment, the second air blowing section 81 includes an annular member 83 fixed to the circumference of the protrusion 73, and a second air guide member 84 formed in a substantially conical shape which extends from the undersurface of the annular member 83 (the surface on the −Z direction-side) to the circumference of the opening of the first air guide member 74. A second introduction port 85 is provided on the annular member 83 so that compressed air is introduced therethrough. The air which has introduced from the second introduction port 85 flows in a space formed between the first air guide member 74 and the second air guide member 84 and is blown out from the opening of the second air guide member 84 toward the platform 200. The opening of the second air guide member 84 and the opening of the first air guide member 74 are concentrically disposed about the center of the nozzle 61. The flow rate from the second air blowing section 81 is not specifically limited, but preferably a flow rate that ensures a laminar flow.

The second air blowing section 81 of the present embodiment configured as above performs blowing of air from the entire circumference of the first air blowing section 71. Alternatively, the second air blowing section 81 may be configured to blow air from air flow ports disposed at three or more, preferably four or more positions on the circumference of the first air blowing section 71 at a constant angular interval. With this configuration as well, air can be blown from the circumference of the first air blowing section 71.

In the present embodiment, the three-dimensional object OB is generally fabricated according to the following procedure. That is, a method for fabricating a three-dimensional object according to the present embodiment includes:
(1) plasticizing a thermoplastic material to transform into a molten material;
(2) ejecting the molten material from the nozzle 61 disposed on the ejection section 60;
(3) blowing air from a circumference of the nozzle 61 toward the molten material ejected from the nozzle 61; and
(4) depositing the molten material ejected from the nozzle onto the platform 200 while changing a relative positional relationship between the ejection section 60 and the platform 200.

Figure 6:
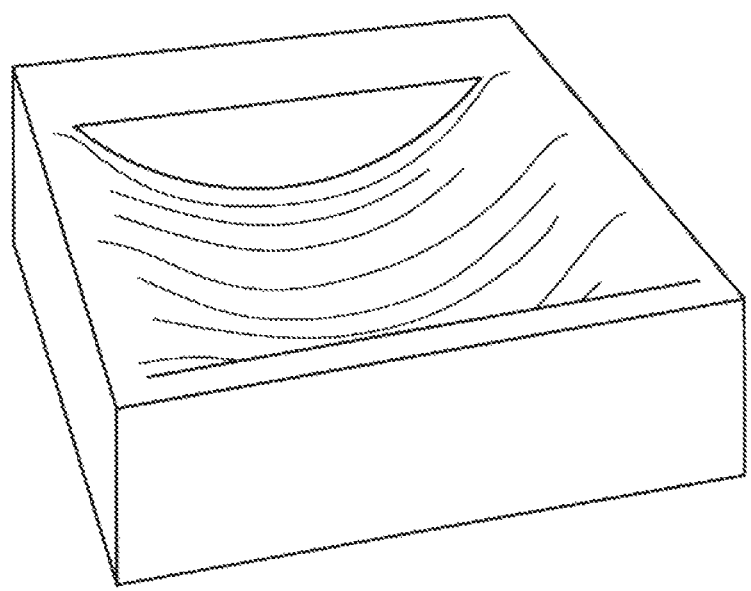
FIG. 6 is a view which illustrates an effect of the first embodiment.
Figure 7:
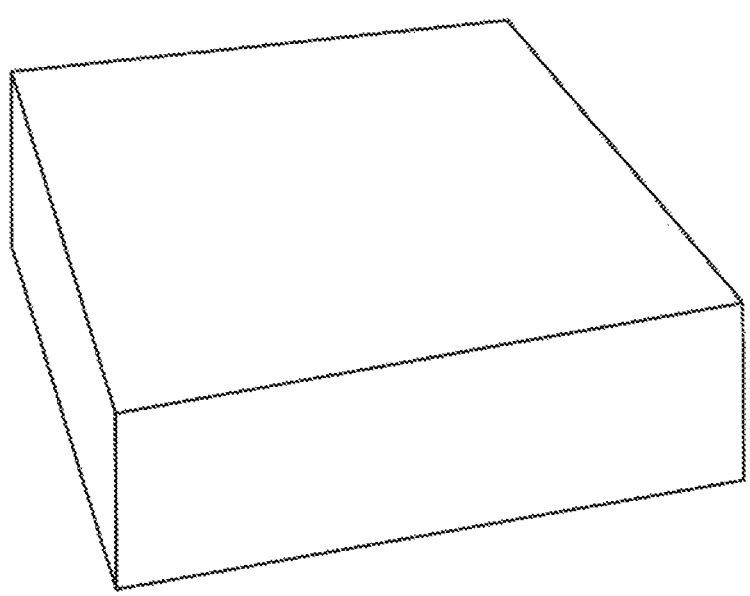
FIG. 7 is a view which illustrates an effect of the first embodiment.
Figure 8:
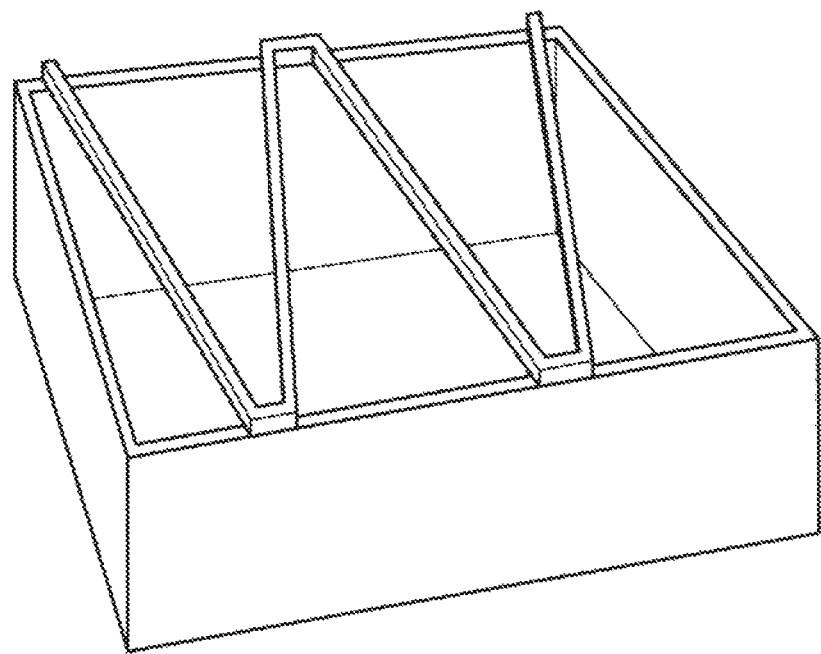
FIG. 8 is a view which illustrates an effect of the first embodiment.

FIGS. 6 to 8 are views which illustrate an effect of the present embodiment. FIG. 6 illustrates a hollow box fabricated as a three-dimensional object without blowing air toward the molten material. As shown in FIG. 6, when air was not blown toward the molten material, the top surface of the box sagged due to its weight. This was attributed to the fact that the temperature of the deposited material was too high to hold the shape. On the other hand, when a box was fabricated while blowing air from the air blowing unit 70, the box was fabricated without sag of the top surface as shown in FIG. 7. Further, as shown in FIG. 8, drawing of a single line in the air can also be performed by blowing air toward the molten material. This was attributed to the fact that the air blowing unit 70 decreased the temperature of the molten material, which enabled adhesion and shape holding of the materials. Further, the three-dimensional objects shown in FIGS. 6 to 8 were all fabricated by transforming an ABS resin having a glass transition temperature of 89° C. into the molten material of a 1.0 mm line diameter and a 200° C. temperature. In addition, the three-dimensional objects shown in FIGS. 7 and 8 were fabricated by depositing the molten material whose temperature was decreased to approximately 100° C. by the air blowing unit 70. The temperature (200° C.) of the molten material before blowing of air is a temperature of the material in the nozzle 61, while the temperature (100° C.) after blowing of air is a temperature of the material at the time when the material is ejected from the nozzle 61 to be deposited on the platform 200 or on the layer which has been already formed.

According to the three-dimensional modeling apparatus 10 of the present embodiment described above, deposition is performed after the temperature of the molten material ejected from the nozzle 61 is decreased by the first air blowing section 71. Accordingly, deformation of the material due to its weight after deposition can be prevented. As a result, the modeling precision of the three-dimensional object can be improved. Further, according to the present embodiment, an overhang portion in the three-dimensional object shown in FIG. 8 can be fabricated without using a support material. The support material is a material for supporting the overhang portion from the underside during fabrication of the three-dimensional object and the material is removed after the three-dimensional object is fabricated.

Further, in the present embodiment, since air is blown toward the molten material from the circumference of the nozzle 61, the ejection direction of the molten material can be stabilized. Accordingly, the modeling precision of the three-dimensional object can be further improved.

Further, in the present embodiment, air blown from the second air blowing section 81 toward the platform 200 can block a change in the air flow around the ejection section 60. Accordingly, fluctuation in the ejection direction of the material ejected from the nozzle 61 due to disturbance factors can be prevented. As a result, the modeling precision of the three-dimensional object can be further improved.

Further, according to the three-dimensional modeling apparatus 10 of the present embodiment, a material is plasticized by the plasticizing section 90 which includes the flat screw 40. As a result, the height of the apparatus can be reduced, and the entire apparatus can be downsized. Further, in the present embodiment, since a material is plasticized into a melted state by using the flat screw 40 and the molten material is ejected from the nozzle 61 to fabricate the three-dimensional object OB, various types and shapes of materials can be used to fabricate three-dimensional objects. This is a great advantage over the conventional fused deposition modeling (FDM) type three-dimensional modeling apparatus, which requires a filament of the material.

In addition, the air blowing unit 70 of the present embodiment includes two air blowing sections, that is, the first air blowing section 71 and the second air blowing section 81. However, the second air blowing section 81 may not be necessarily provided. Further, in the present embodiment, the control unit 300 controls whether the air blowing unit 70 blows air or not. However, blowing of air from the air blowing unit 70 can also be controlled manually or by use of another device.

B. Second Embodiment

In the first embodiment, air is uniformly blown from the entire circumference of the nozzle 61 by the air blowing unit 70. On the other hand, in the second embodiment, the control unit 300 controls the direction of air flow from the air blowing unit.

Figure 9:
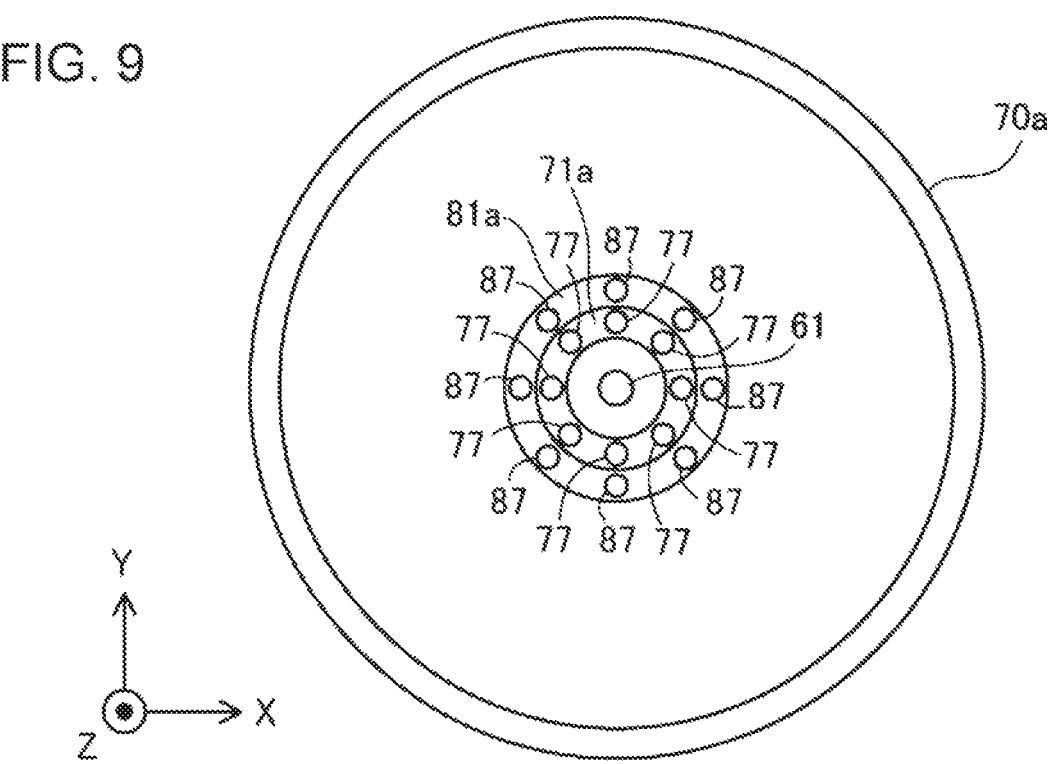
FIG. 9 is an explanatory view of a schematic configuration of an air blowing unit of a second embodiment.

FIG. 9 is an explanatory view of a schematic configuration of an air blowing unit 70a of the second embodiment. FIG. 9 illustrates positioning of air outlets of the air blowing unit 70a as viewed from the above (on the +Z direction-side). A first air blowing section 71a of the present embodiment includes a plurality of first air outlets 77 disposed around the nozzle 61 to perform blowing of air toward the molten material ejected from the nozzle 61. The flow rate of the first air outlets 77 can be each adjusted. In the present embodiment, eight first air outlets 77 are disposed around the nozzle 61 at a constant angular interval. Compressed air is supplied to the respective first air outlets 77 via a piping. The control unit 300 controls on/off and flow rate of the air flow of each of the first air outlets 77 by controlling valves disposed in the piping.

Further, a second air blowing section 81a of the present embodiment includes a plurality of second air outlets 87 disposed around the first air blowing section 71a to perform blowing of air toward the platform 200. The flow rate of the second air outlets 87 can be each adjusted. In the present embodiment, eight second air outlets 87 are disposed around the first air blowing section 71a at a constant angular interval. Compressed air is supplied to the respective second air outlets 87 via a piping. The control unit 300 controls on/off and flow rate of the air flow of each of the second air outlets 87 by controlling valves disposed in the piping.

In the present embodiment, the control unit 300 controls the flow rate of each of the first air outlets 77 depending on the movement direction of the ejection section 60 relative to the platform 200. Further, the control unit 300 controls the flow rate of each of the second air outlets 87 depending on the movement direction of the ejection section 60 relative to the platform 200.

Figure 10:
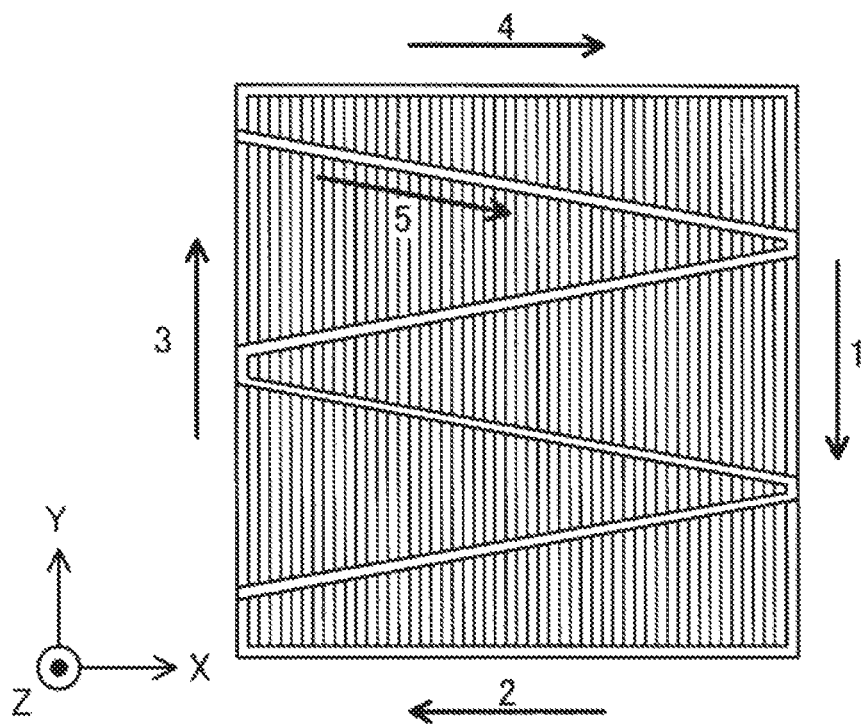
FIG. 10 is an explanatory view which illustrates a concept of flow rate control by a control unit.

FIGS. 10 and 11 are explanatory views which illustrate a concept of air flow control by the control unit 300. FIG. 10 shows the movement direction of the ejection section 60 during fabrication of the three-dimensional object shown in FIG. 8. The first direction shown in FIG. 10 indicates the direction of the ejection section 60 moving in the −Y direction. The second direction indicates the direction of the ejection section 60 moving in the −X direction. The third direction indicates the direction of the ejection section 60 moving in the +Y direction. The fourth direction indicates the direction of the ejection section 60 moving in the +X direction. The fifth direction indicates the direction of the ejection section 60 moving in the +X direction and −Y direction.

FIG. 11 illustrates the amount of air flow (flow rate) of the first air outlets 77 and the second air outlets depending on the movement direction of the ejection section 60. Further, FIG. 11 illustrates a blow direction of air to the deposited linear shaped molten material in conjunction with the cross-section of the molten material. As shown in FIGS. 10 and 11, in the present embodiment, the control unit 300 increases the flow rate of the first air outlets 77 and the second air outlets 87 located forward and lateral side in the movement direction of the ejection section 60. On the other hand, the control unit 300 decreases the flow rate of the first air outlets 77 and the second air outlets 87 located rearward in the movement direction of the ejection section 60.

According to the present embodiment, controlling the flow rate of the first air outlets 77 and the second air outlets 87 can reduce the effect of the change in air flow around the ejection section 60 caused by movement of the ejection section 60 on the ejection direction of the molten material ejected from the nozzle 61. Accordingly, three-dimensional objects can be fabricated with higher precision.

In the present embodiment, the flow rates of the air outlets of both the first air blowing section 71a and the second air blowing section 81a are controlled. However, the air outlets of either the first air blowing section 71a or the second air blowing section 81a may also be controlled.

Further, the present embodiment is described as having eight first air outlets 77 and eight second air outlets 87. However, the number of air outlets may be smaller (e.g., four) or larger (e.g., sixteen) than those described.

Further, in the present embodiment, the flow rate is adjusted in three levels (low flow rate, medium flow rate, and high flow rate) as shown in FIG. 11. However, the flow rate may be adjusted in two levels, that is, whether to blow or not to blow.

C. Third Embodiment

Figure 12:
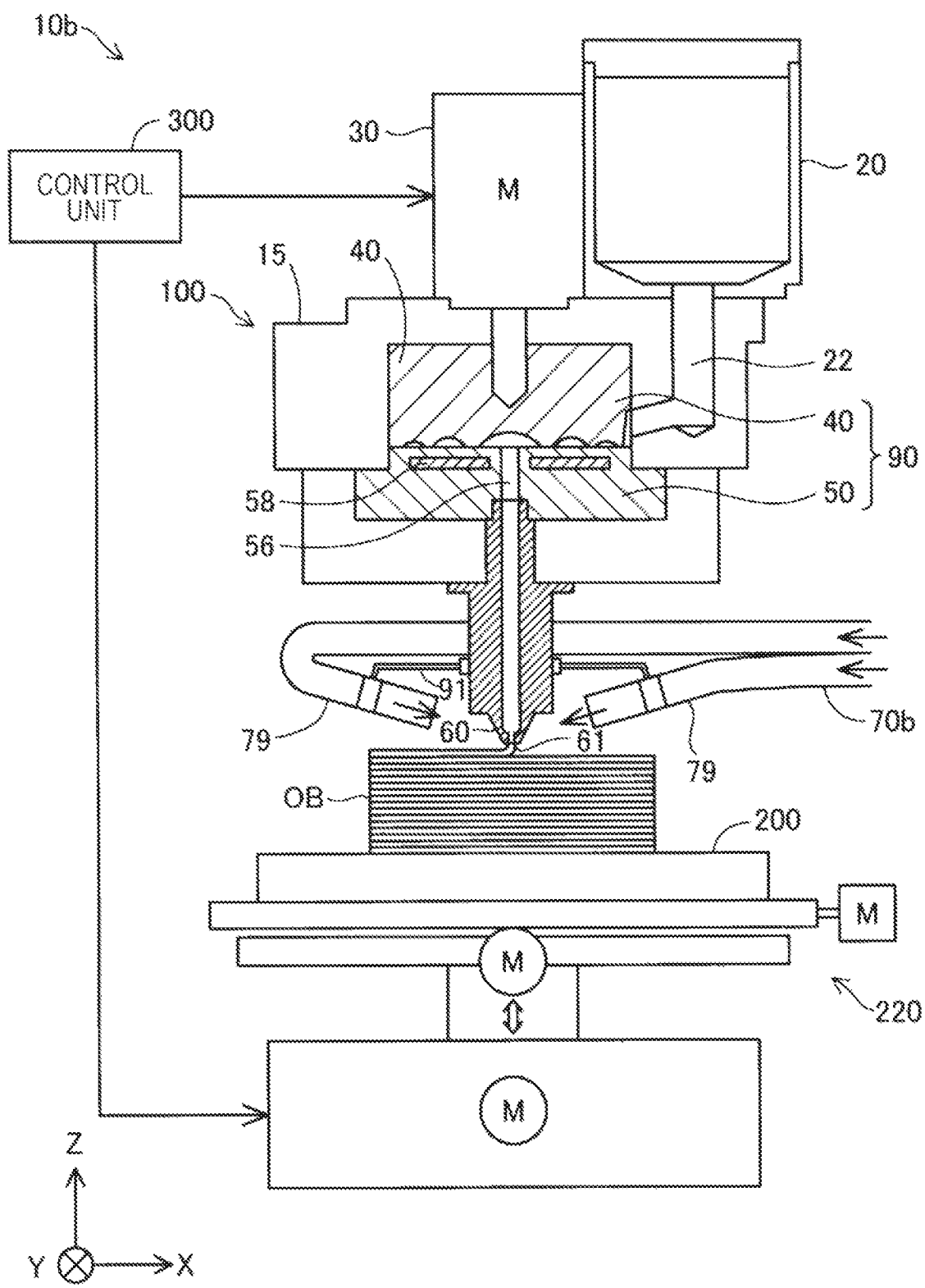
FIG. 12 is an explanatory view of a schematic configuration of a three-dimensional modeling apparatus of a third embodiment.

FIG. 12 is an explanatory view of a schematic configuration of the three-dimensional modeling apparatus 10b of the third embodiment of the present invention. The third embodiment differs from the other embodiments in the configuration of the air blowing unit.

As shown in FIG. 12, an air blowing unit 70b of the present embodiment includes four tubes 79 disposed around the nozzle 61 (ejection section 60) at a constant angular interval. For convenience of illustration, only two tubes 79 are shown in FIG. 12. These tubes 79 are, for example, fixed to the ejection section 60 or the screw case 15 by a clamp 91 or the like. Each tube 79 has a function corresponding to the first air blowing section 71 of the first embodiment. Therefore, compressed air is introduced into the respective tubes 79 so that air is blown from the end of each tube 79 toward the molten material ejected from the nozzle 61.

As shown in the present embodiment, the temperature of the molten material ejected from the nozzle 61 can also be decreased by use of the air blowing unit 70b configured with the tube 79 to thereby improve modeling precision of the three-dimensional object OB. With this configuration, since the three-dimensional modeling apparatus 10b with a simple configuration can be provided, the production cost of the three-dimensional modeling apparatus 10b can be reduced.

Further, the present embodiment is described as having four tubes 79. However, the number of tubes 79 may be more than four. For example, as with the third embodiment, eight tubes 79 may be disposed around the nozzle 61 at a constant angular interval. Moreover, a plurality of tubes may be disposed around these tubes 79 at a constant angular interval to thereby configure the first air blowing sections 71 and the second air blowing sections 81 with the tubes.

D. Modified Example

Modified Example 1

In the above embodiment, air is blown to the material (constituent material) of the three-dimensional object. However, air may be blown to a support material that supports the constituent material. That is, the present invention may be applied not only to the constituent material, but also to deposition of the support material used for fabrication of the three-dimensional object. Modified Example 2

In the above embodiment, the flat screw 40 is used to plasticize the material. However, the ejection unit 100 is not limited to that uses the flat screw 40 as long as it is configured to plasticize a material for ejection. For example, the ejection unit 100 may be configured to melt a material by using a preheater and extrude the molten material from an extrusion nozzle by rotation of a long-length screw.

Modified Example 3

In the above embodiment, the three-dimensional modeling apparatus 10 includes the ejection unit 100, the platform 200, and the control unit 300. Alternatively, only the ejection unit 100 can be regarded as the three-dimensional modeling apparatus in a more restricted sense.

Modified Example 4

In the above embodiment, the three-dimensional modeling apparatus 10 includes one ejection unit 100. Alternatively, the three-dimensional modeling apparatus 10 may include a plurality of ejection units 100. For example, in the configuration having two ejection units 100, one of the ejection units 100 may be configured to eject a support material for supporting the three-dimensional object OB, while the other may be configured to eject the constituent material of the three-dimensional object OB. Further, the respective ejection units 100 may be configured to eject different colors or different types of the molten material.

Modified Example 5

In the above embodiment, the hopper 20 is provided in the ejection unit 100. However, the hopper 20 may be provided outside the ejection unit 100. Further, in the above embodiment, a material is supplied from the hopper 20. However, a material supply means is not limited to the hopper 20 as long as a material can be supplied to the flat screw 40.

Modified Example 6

In the above embodiment, the flow rate from the first air blowing section 71 may be modified depending on the diameter of the nozzle 61. That is, the flow rate can be adjusted depending on the line diameter of the molten material ejected from the nozzle 61. For example, the flow rate can be increased with an increase in line diameter to thereby efficiently decrease the temperature of the molten material. Further, the temperature of the blown air can be adjusted depending on the diameter of the nozzle 61 (line diameter of the molten material) ejected from the nozzle 61. For example, the temperature of the blown air can be decreased with an increase in the line diameter to thereby efficiently decrease the temperature of the molten material. Further, a gas blown from the air blowing unit 70 is not limited to air, and may be an inert gas such as nitrogen, for example. The type of the gas may be modified as appropriate depending on the type of the molten material.

Modified Example 7

In the above embodiment, the flow rate from the air blowing unit 70 may be modified depending on the movement speed of the ejection section 60. For example, the control unit 300 may decrease the flow rate from the first air blowing section 71 with an increase in the movement speed of the ejection section 60, and may increase the flow rate from the first air blowing section 71 with a decrease in the movement speed of the ejection section 60. According to this configuration, the flow rate can be increased when the movement speed of the ejection section 60 decreases during modeling of a corner of the three-dimensional object, for example. As a result, the temperature of the molten material may be quickly decreased during modeling of a corner, which improves a modeling precision of the corner.

Modified Example 8

In the above embodiment, the control unit 300 may suspend blowing of air from the air blowing unit 70 in ejection of the molten material that is directly in contact with the platform 200. According to this configuration, the molten material can be prevented from being peeled off from the platform 200.

The present invention is not limited to the above embodiment and modification examples, and can be embodied as various configurations without departing from the scope of the present invention. For example, the technical features in the embodiment and modified examples corresponding to the technical features in the examples described in the summary of the invention may be replaced or combined as appropriate in order to solve part or all the above problems or achieve part or all the above effects. Further, as long as the technical feature is not described as an essential element in the foregoing description, the technical feature may be eliminated as appropriate.

What is claimed is:
1. A three-dimensional modeling apparatus for fabricating a three-dimensional object, the three-dimensional modeling apparatus comprising:
a plasticizing section that plasticizes a thermoplastic material into a molten material;

an ejection section having a nozzle for ejecting the molten material;

a first air blowing section that blows air from a circumference of the nozzle toward the molten material ejected from the nozzle;

a platform on which the molten material ejected from the nozzle is deposited;

a second air blowing section that blows air from a circumference of the first air blowing section toward the platform, at least one of the first and second air blowing sections including a plurality of air outlets to perform the blowing of air thereof;

a control unit that controls the first and second air blowing sections, the control unit configured to independently control a flow rate of the air from each of the air outlets; and a transport mechanism that changes a relative positional relationship between the ejection section and the platform.

2. The three-dimensional modeling apparatus according to claim 1, wherein:

the first air blowing section includes the plurality of air outlets as first air outlets disposed around the nozzle to perform the blowing of air toward the molten material ejected from the nozzle, and the control unit controls a flow rate of each of the first air outlets depending on a movement direction of the ejection section relative to the platform.

3. The three-dimensional modeling apparatus according to claim 2, wherein:

the second air blowing section includes the plurality of air outlets as second air outlets disposed around the first air blowing section to perform the blowing of air toward the platform, and the control unit controls a flow rate of each of the second air outlets depending on a movement direction of the ejection section relative to the platform.

4. The three-dimensional modeling apparatus according to claim 1, wherein:

the second air blowing section includes the plurality of air outlets as second air outlets disposed around the first air blowing section to perform the blowing of air toward the platform, and the control unit controls a flow rate of each of the second air outlets depending on a movement direction of the ejection section relative to the platform.

5. The three-dimensional modeling apparatus according to claim 1, wherein the plasticizing section includes a flat screw and a heating unit.

6. The three-dimensional modeling apparatus according to claim 1, wherein the plurality of air outlets are disposed at a constant angular interval with respect to one another.

7. The three-dimensional modeling apparatus according to claim 1, further comprising:

piping for supplying air to the plurality of air outlets; and valves disposed in the piping for providing the independent control.

8. A method for fabricating a three-dimensional object using the three-dimensional modeling apparatus of claim 1, the method comprising:

plasticizing the thermoplastic material into the molten material in the plasticizing section;

ejecting the molten material from the nozzle of the ejection section;

blowing air from the circumference of the nozzle toward the molten material ejected from the nozzle using the first air blowing section;

blowing air from the circumference of the first air blowing section using the second air blowing section;

depositing the molten material ejected from the nozzle onto the platform while changing a relative positional relationship between the ejection section and the platform; and independently controlling flow rate of each of the air outlets of the at least one first and second air blowing sections.

* * * * *